Aug. 21, 1962   D. R. LIGH   3,050,026
HATCH COVER ARRANGEMENT
Filed May 27, 1957   3 Sheets-Sheet 1

INVENTOR.
David R. Ligh
BY Michael S. Striker
Attorney

Aug. 21, 1962 D. R. LIGH 3,050,026
HATCH COVER ARRANGEMENT
Filed May 27, 1957 3 Sheets-Sheet 2

INVENTOR.
David R. Ligh
Michael S. Striker
BY

Aug. 21, 1962     D. R. LIGH     3,050,026
HATCH COVER ARRANGEMENT
Filed May 27, 1957     3 Sheets-Sheet 3
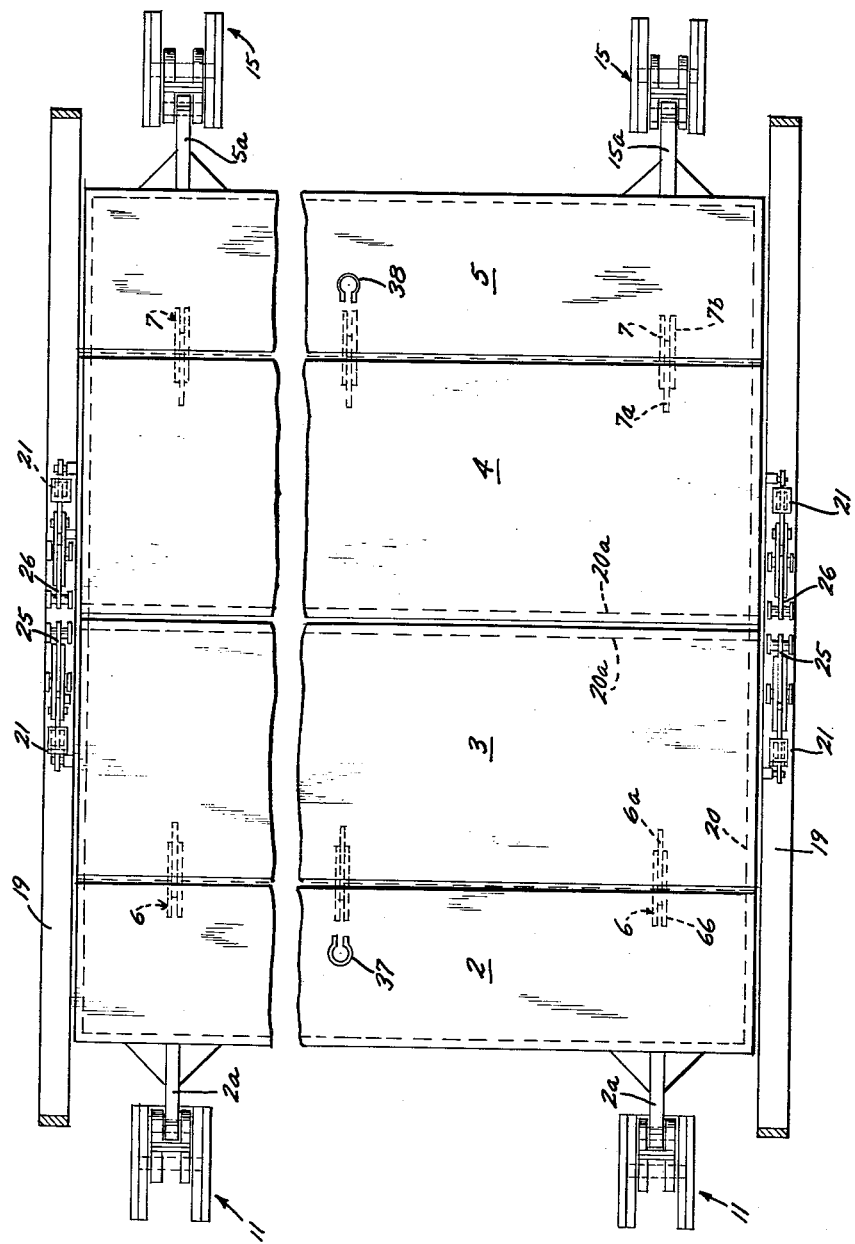
INVENTOR.
David R. Ligh
BY Michael S. Striker
Attorney

United States Patent Office 3,050,026
Patented Aug. 21, 1962

3,050,026
HATCH COVER ARRANGEMENT
David R. Ligh, Mariners Harbor, N.Y.
(193 Main St., Madison, N.J.)
Filed May 27, 1957, Ser. No. 661,797
14 Claims. (Cl. 114—202)

The present invention relates to a hatch cover arrangement, and more particularly to a hatch cover arrangement for covering the hatches of sea-going vessels.

Cargo carrying ships have a top deck, and a plurality of spaced cargo carrying decks below the top deck. In order to provide for unloading or loading of the ship, the decks are formed with vertically aligned hatch openings through which the cargo is raised or lowered by means of power operated mechanisms. After the ship has been properly loaded, the hatch opening is closed by a suitable hatch cover. A hatch coaming surrounds the hatch opening and is provided with a sealing edge which is engaged by the hatch cover to provide a water-tight closure of the hatch opening.

It is one object of the present invention to provide a hatch cover arrangement which can be rapidly and efficiently operated to open and close the hatchway while providing a water-tight seal in closed position.

It is another object of the present invention to provide a hatch cover arrangement in which a hatch cover rests on a flat coaming surrounding the hatchway when the hatch cover is closed, and moves to a hatch opening position without chafing the sealing means between the hatch cover and the coaming.

It is another object of the present invention to provide a hatch cover arrangement including two foldable hatch cover means which are movable to and from a hatch closing position in which the inner ends of the hatch cover means engage each other and seal the hatchway, while during movement to open position the sealing ends of the two hatch cover means separate without chafing.

It is another object of the present invention to provide a hatch cover arrangement including foldable hatch cover means and to provide means for preventing the ends of the hatch cover means to scrape along the sealing edge of the hatch coaming when the hatch cover means moves to a folded position in which the hatchway is opened.

It is a further object of the present invention to provide a hatch cover arrangement in which all sealing gaskets are separated from each other during the opening of the hatch cover in such a manner that the separating sealing parts move away from each other in substantially perpendicular direction.

With these objects in view, the present invention mainly consists in a hatch cover arrangement which comprises, in combination, a hatch coaming having a sealing edge; a pair of first pivot means located on opposite ends of the hatch coaming; a hatch cover including two hatch cover means, each hatch cover means including an inner part and an outer part, and a second pivot means pivotally connecting said inner and outer parts for movement between a substantially aligned position and a plurality of folded positions, each outer part being supported on one of the first pivot means, and each inner part having an inner edge in sealing engagement with the inner edge of the other inner part in hatch closing position of said hatch cover; track means located on both sides of the hatch coaming; trolley means rolling on said track means and including third pivot means pivotally connected to the inner parts of the hatch cover means, the axes of said first, second and third pivot means being aligned in said aligned position of the hatch cover means; an operating means connected to the hatch cover means for moving the same from the aligned position to the folded positions with the second pivot means moving along a circle about the first pivot means whereby the inner edges of the inner parts move apart so that sealing strips on the inner edges are not compressed or chafed. The second pivot means may also be located above the plane defined by the axes of the first and third pivot means.

In the preferred embodiment of the present invention other operating means are provided for turning each of the hatch cover in aligned position about the first pivot means from a hatch closing position into a slightly raised position in which the axes of the first, second, and third pivot means are aligned.

The inner ends of the hatch cover means are provided with lever means which are pivotally connected to the trolleys running on tracks adjacent the hatch. When the first operating means turn the lever means, the inner ends of the hatch cover means are raised while the hatch cover means turns in aligned position of its parts about the first pivot means. When thereupon the second operating means fold the hatch cover means, the respective inner edge turns on the trolleys without engaging the sealing edge of the hatch coaming. During the following folding movement of the hatch cover means the trolleys roll on the tracks and partly support the hatch cover means.

The pivot supports which support the hatch cover means are constructed in such a manner that after the hatch cover means are partly folded, the pivot axis is shifted so that during further folding movement, the hatch cover means turn about a different axis. Thereby it is possible to place the center of gravity of the folded hatch cover means inwardly of a vertical plane passing through the new turning axis when the hatch cover means is completely folded so that the hatch cover means tend to return to hatch closing position.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 4 is a plan view of the arrangement showing the hatch cover in the closed position of FIG. 1.

Figure 1:
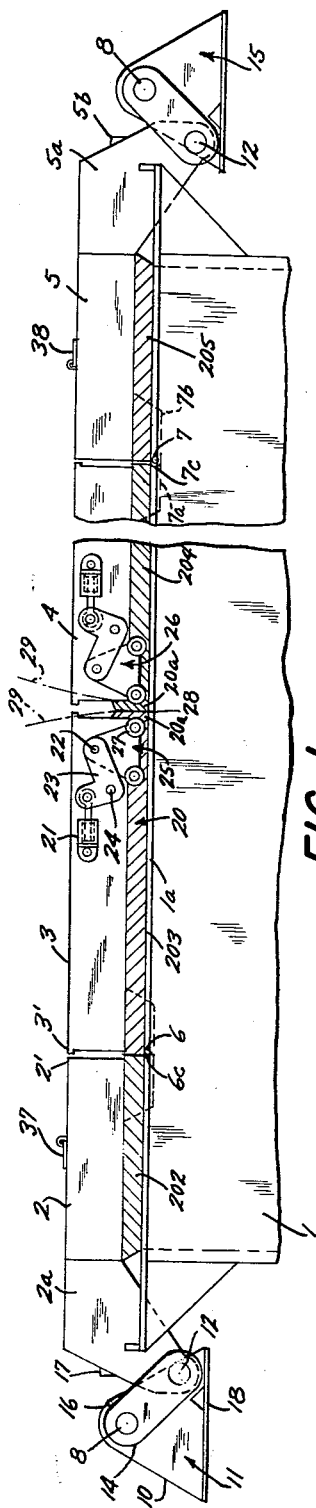
FIG. 1 is a side view of a hatch cover arrangement according to the present invention.

Referring now to the drawings, and more particularly to FIGS. 1 and 4, the illustrated hatch cover arrangement includes a hatch cover consisting of two hatch cover means. The hatch cover means on the left side of FIG. 1 has an inner part 3 and an outer part 2, and the hatch cover means on the right side of FIG. 1 has an inner part 4 and an outer part 5. The parts 2 and 3 are connected by hinges 6 which include a hinge member 6a secured to part 3, and two hinge members 6b secured to part 2. A pivot pin 6c passes through the hinge members 6a and 6b. The parts 4 and 5 of the other hatch cover means are hinged to each other in a corresponding manner by hinges 7 including hinge members 7a and 7b, and a hinge pin 7c. The outer part 2 is provided with a pair of hinge members 2a, and the outer part 5 is provided with a pair of hinge members 5a. The hinge members 2a and 5a, respectively, connect their respective hatch cover means to pivot supports 11 and 15 which are arranged at both ends of the hatch coaming 1. The hatch coaming 1 surrounds a hatchway in the deck of the vessel which is closed by the hatch cover means 2, 3, 4, 5. The hatch coaming 1 has a sealing edge 1a which is engaged by sealing means 20 secured to the hatch cover. The sealing means 20 includes portions 202, 203, 204, and 205 which are respectively secured to the hatch cover parts 2, 3, 4, and 5. The sealing means 20 includes transverse strips which extend transversely across the hatchway between adjacent edges of the hatch cover parts 2, 3, 4, and 5, and are in sealing engagement in the closed position of the hatch cover means shown in FIGS. 1 and 4. It will be understood that the transverse strips 20a form the inner edges of the inner parts 3 and 4 of the hatch cover means.

Two pivot supports 11 and two pivot supports 15 are provided as best seen in FIG. 4. Each pivot support includes a bracket consisting of two parts 10, link means 14 which are mounted for turning movement on the brackets 10 by means of pins 8, and a pivot pin 12 which passes through the hinge member 2a or 5a associated with the respective pivot support and is mounted in the pair of link means 14. The hinge members 2a, and 5a, are respectively located between pairs of link members 14. A stop means 16 extends across each pair of link members 14 and engages a corresponding stop 17 provided on the hinge members 2a, and 5a, respectively, when the respective hatch cover means turns about the axis of pivot pin 12 from the position shown in FIG. 1 into the position shown in FIG. 3, as will be described hereinafter in greater detail. Stops 18 are provided on the pivot supports for engaging the link members 14 in the position illustrated in FIG. 1.

The two pivots 12 which are mounted in the link means 14 of the two pivot supports 11 associated with the hatch cover means 2, 3 and the two pivots 12 which are mounted in the link means 14 of the two pivot supports 15 associated with the hatch cover means 4, 5, are respectively coaxial. The two pivots 12 of the pivot supports 11 define a pivot axis which is located below the sealing edge 1a of the hatch coaming 1. The pivot axis for the hatch cover means 4 and 5 defined by the pivots 12 of the pivot supports 15 is located at the same height, and also below the sealing edge 1a of the hatch coaming 1. Consequently, the inner edges 28 of the sealing strips 20a are located above their respective pivot axes.

When the hatch cover is closed, as shown in FIG. 1, the gasket 20 is compressed approximately 15% of its total height which amount is sufficient to overcome minor irregularities, distortions, and obstructions which would prevent a water-tight seal. The portions 20a of the sealing means are similarly compressed in the closed position of the hatch cover to produce a water-tight seal between the two hatch cover means 2, 3 and 4, 5.

Figure 2:
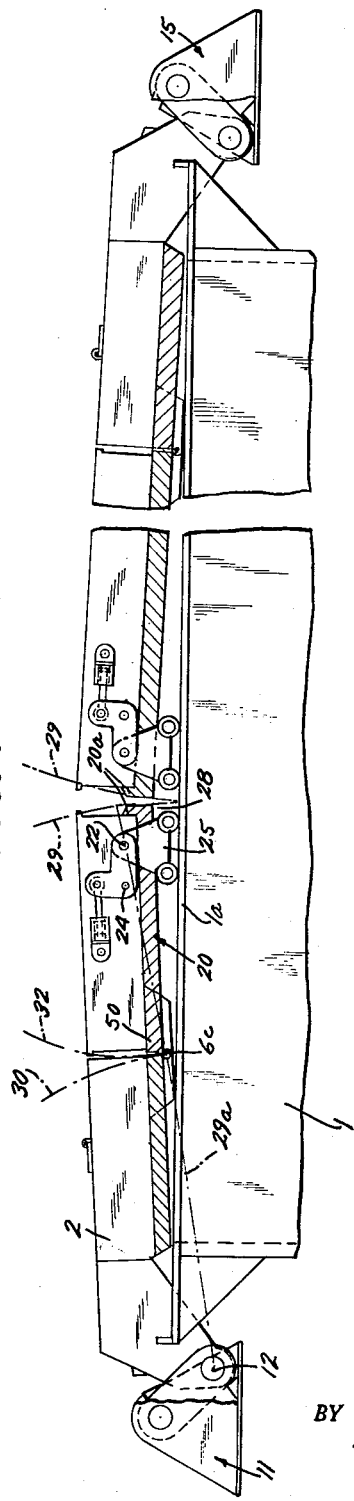
FIG. 2 is a side view corresponding to FIG. 1 but showing the arrangement in a different position.
Figure 3:
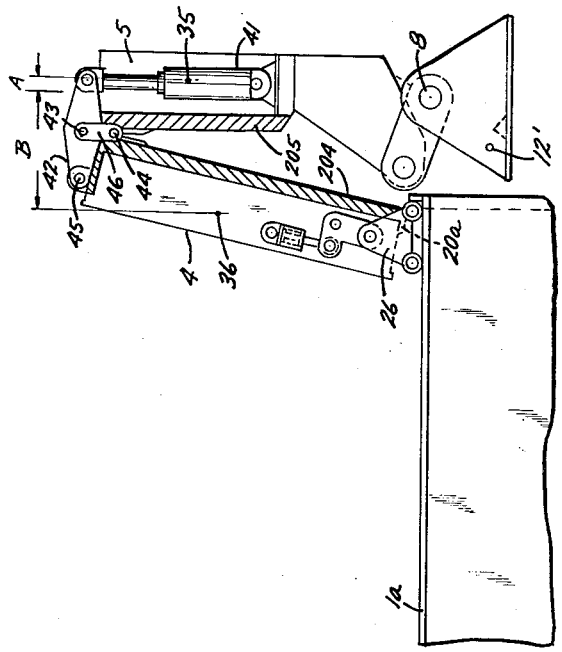
FIG. 3 is a side view corresponding to FIGS. 1 and 2, but showing the arrangement in a different position.
Figure 3:
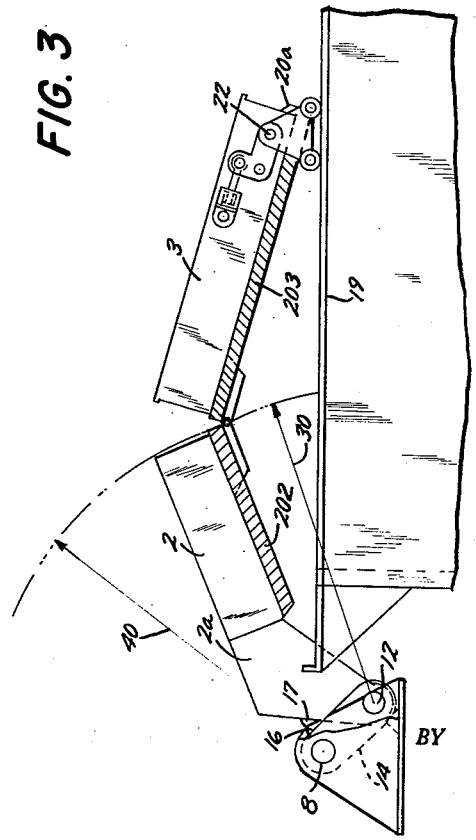

Each hatch cover means is so constructed that it can fold by turning about the hinges 6 and 7, respectively, as shown in FIG. 3. During movement to folded position, the cover part 2 turns in counterclockwise direction about the pivot pins 6c, and the cover part 3 turns in clockwise direction about the pivot pins 6c. The cover parts 2 and 3 abut against each other in the aligned position shown in FIGS. 1 and 2 along the transverse edges 2' and 3'. Consequently, when the hatch cover means 2, 3 and 4, 5 respectively are slightly raised by applying a force to parts 8 and 4, respectively, the two hatch cover parts turn together in aligned position about the axis defined by the pivots 12. Since the pivot axis of the pivot 12 is located below the inner edges 28 of the sealing strips 20a, the two sealing strips 20a move apart during movement of either hatch cover means. Each inner edge 28 moves along a circular path 29 having a radius 29a.

First operating means are provided for raising the hatch cover means from the hatch closing position shown in FIG. 1 to the slightly raised position shown in FIG. 2. A pair of hydraulic motors is fixedly secured to both sides of the inner part of each hatch cover means. Each hydraulic motor 21 has a movable member which is pivotally connected to a lever means 23 shown to be a bell crank lever which is supported for turning movement on the respective hatch cover means by a pivot pin 24. The second arm of the bell crank lever 23 is pivotally connected at 22 to a trolley 25 which includes a pair of wheels 27. In the position illustrated in FIG. 1, the hydraulic motor has retracted the bell crank lever 23 so that the wheels 27 are raised from the track means 19 which are provided on both sides of the hatch coaming 1 substantially at the height of the sealing edge 1a. When, however, the hydraulic motor is actuated to turn the bell crank lever 23 into the position illustrated in FIG. 2, the trolley means 25 is first moved into a position in which the wheels 27 engage the respective track 19, whereupon the respective hatch cover means 2, 3 or 4, 5 is raised in alinged position. The pair of hydraulic motors 21 which are mounted on the same hatch cover part, for instance the hatch cover part 3, are hydraulically connected so that the trolleys 25 are simultaneously actuated to uniformly raise the entire hatch cover means. Since the two hatch cover parts 2, 3 cannot fold during turning movement of the entire hatch cover means in counterclockwise direction, the hatch cover means remains in aligned position and moves from the hatch closing position shown in FIG. 1 to the slightly raised position shown in FIG. 2 while turning about the axis of the aligned pivots 12 of the two pivot supports 11. The other hatch cover means 4, 5 is operated in a corresponding manner. As previously explained, the inner edges 28 of the inner hatch cover parts 3 and 4 move apart during such turning movement since the pivot axis 12 is located below the sealing edge 1a of the hatch coaming. In the event that the pivot axis 12 would be located above the inner edges 28, turning movement about such pivot axis would force the sealing strips 20a into tighter engagement which of course is highly undesirable since it would lead to chafing and eventual damaging of the sealing strips 20a.

Second operating means are necessary for moving the hatch cover means from the position shown in FIG. 2 into the partly folded position shown in FIG. 3 on the left side and eventually to the completely folded position shown on the right side of FIG. 3. The hatch cover means have fixedly attached thereto ring members 37 and 38, respectively, which are best seen in FIG. 4. When the hooks of cargo winch lines are attached to the rings 37 and 38, the hatch cover means are raised and fold.

According to another embodiment, hydraulic operating means are provided for folding the hatch cover means, as for example illustrated in the right-hand portion of FIG. 3. A hydraulic actuator mechanism includes a cylinder 41, a piston movable in the cylinder and connected by piston rod to a cross head 42 which is connected by a link 43 to a fulcrum 44, and is also connected by a pivot means 45 to the inner hatch cover part. When the hydraulic piston is advanced the two hatch cover parts are forced to fold. This arrangement is not an object of the present invention, and described in detail in my copending application Serial No. 566,875, filed on February 21, 1956.

Regardless of which kind of second operating means is provided, such second operating means produce relative turning movement between the two hatch cover parts 2 and 3, and between the two hatch cover parts 4 and 5. Assuming that a winch line engaging a ring 37 pulls the outer hatch cover part 2 upwardly, the hatch cover part 2 will turn about the axis of the pivots 12, with the hinge 6 moving along the circle 30 shown in FIG. 3. At the same time the inner hatch cover part 3 will roll on the trolleys 25 on the tracks 19. During such movement the hydraulic motor 21 rigidly holds the bell crank lever 23 in the position illustrated in FIGS. 2 and 3 so that the pivot 22 does not move relative to the hatch cover part 3. Consequently, the respective inner edge 28 of the hatch cover part moves along a circular path which has its center in the axis of the pivot 22. The distance between the inner edge 28 and the pivot axis 22 is smaller than the distance between the pivot axis 22 and the sealing edge 1a of the hatch coaming 1. Consequently, the inner edge 28 turning about the axis of the pivot 22 cannot engage the sealing edge 1a while moving from the position shown on the left-hand side of FIG. 3 to the position shown on the right-hand side of FIG. 3 without requiring a track located above the coaming edge 1a.

In the slightly raised position illustrated in FIG. 2, the axis of the first pivot means 12, the axis of the second pivot means 6c and the axis of the third pivot means 22 are aligned along the line 29a. Consequently, when the operating means move the hatch cover means to the partly folded position shown in FIG. 3, the pivot means 6c moves along the circle 30, which has its center in the axis of the pivot means 12. Since the tangent on the circle 30 at the point 6c is perpendicular to the line 29a, the pivot means 6c moves to the left in FIG. 2 so that the hatch cover part 3 also moves to the left whereby the sealing strips 20a move apart. If the pivot means 6c were located below a straight line connecting the axes of the pivot means 12 and 22, then the pivot means 6c would move slightly to the right when the hatch cover means 2, 3 move to folded position, and the sealing strips 20a along the inner edges of the hatch cover parts 3 and 4 would move toward each other and be compressed and chafed. In accordance with the present invention, the pivot means 6c could also be located above the plane passing through the axes of pivot means 12 and 22.

The pivot 22 must be above the transition point of contact 28 in order to permit separation of the gasket as the part 3 hinges upward about the circular path 32. The higher up the axis of pivot 22 is located, the better will the operation be, except for structural limitations.

When the hatch cover means has arrived in the position shown on the left-hand side of FIG. 3, the hinge members 2a have moved into a position in which the stops 17 on the hinge members 2a engage the associated stops 16 on the link means 14. Further turning movement of the outer hatch cover part 2 about the axis of the pivots 12 is thereby terminated. When the hatch cover means is further raised by the winch lines, or further forced into a folded position by the hydraulic actuator illustrated on the right-hand side of FIG. 3, the respective hatch cover means will now start turning about the axis of the pivots 8 with the hinge 6 moving along the circle 40. The link means 14, and the pivots 12 will also turn about the axis defined by the pivot means 8. Finally the position shown on the right-hand side of FIG. 3 will be obtained in which the hatch cover means is completely folded, and the hatchway fully opened for a loading or unloading operation.

It will be noted that the provision of the link means 14 results in shifting of the pivot axis of the respective hatch cover means during the opening movement. The arrangement has a particular advantage, since the center of gravity of the hatch cover means is in the final completely folded position of the hatch cover means located between the hatchway and a vertical plane passing through the turning axis. Thereby the hatch cover means tends to automatically close under its own weight. For example, in the position on the right-hand side of FIG. 3, the center of gravity 35 of the outer hatch cover part 5 is located spaced a distance A from the vertical plane passing through the axis of the pivots 8. The center of gravity 36 of the inner hatch cover part 4 is located spaced a distance B from the vertical plane passing through the axis of the pivots 8. The torque exerted by the weight of the inner part 4 acting at the distance B is greater than the torque exerted by the outer part 5 acting at the distance A, and consequently the hatch cover means 4, 5 will tend to unfold, to keep the trolleys on the track and to roll on the trolleys 26 to hatch closing position when released by the second operating means shown to be a hydraulic actuator. Of course, as long as the hydraulic actuator holds the hatch cover means 4, 5, or as long as the hatch cover means is held by winch lines, a closing of the hatch cover means is not possible.

If the pivot axis of the hatch cover means would not have been shifted from the pivots 12 to the pivots 8, the center of gravity of the entire hatch cover means 4, 5 would have been outwardly of the vertical plane passing through the previous pivot axis indicated by the reference numeral 12′, and consequently the entire hatch cover could drop while turning in clockwise direction on the right-hand side of FIG. 3. Particularly when the hatch cover means is operated by a hydraulic actuator, the hatch cover means would drop outwardly as soon as the center of gravity thereof passes beyond a vertical plane passing through the turning axis. This disadvantageous result is prevented by the construction of the present invention according to which the pivot axis of the hatch cover means is shifted during the movement of the hatch cover means from hatch closing position to hatch opening position.

It will be understood that in the event that hydraulic first operating means 21, 23 are used simultaneously with hydraulic actuator means 41, 42 it is necessary to operate the respective hydraulic means in a time sequence, that is first the hydraulic motors 21 are actuated until the respective hatch cover means is moved to the slightly raised position shown in FIG. 2, and thereupon the second operating means, namely the hydraulic actuator 41 is actuated to further fold the hatch cover means.

Different types of gaskets can be used in the arrangement of the present invention, for example, a rubber-like material may be embedded in a channel, or a flat strip of rubber may be fastened with bolts. A tapered type with a semi-rigid canvas back as shown in the drawings, is preferably used and may be glued directly to the hatch cover means. In any event, due to the mechanical movements of the arrangement of the present invention there is never a sliding of the sealing means on the associated sealing edges.

Due to the construction of the present invention the sealing edges 20a move apart at the beginning of the hatch opening movement. The sealing edges 50 move apart from each other and the sealing means 20 moves away from the sealing edge 1a of the hatch coaming during the second part of the movement of the hatch cover means, and the inner edges 28 are prevented from engaging the sealing edge 1a by the provision of the trolleys 25 and 26.

In the closed position of the hatch cover shown in FIG. 1, suitable dogs, not shown in the drawing, are used for holding down the hatch cover.

It will be understood that each of the elements described above, or two or more together, may also find a useful application in other types of hatch cover arrangement differing from the types described above.

While the invention has been illustrated and described as embodied in a hatch cover arrangement including foldable hatch cover means in which chafing and compression of the sealing means is prevented and whose turning axis is shifted during the opening and closing movements of the hatch cover means, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A hatch cover arrangement comprising, in combination, a hatch coaming having a sealing edge; two pivot supports respectively located on opposite ends of said hatch coaming, each pivot support including link means having a first pivot means with a first pivot axis, said link means being turnable about a second pivot axis with said first pivot means turning about said second pivot axis to and from a first position, each of said pivot supports further including stop means on said link means; a hatch cover including two hatch cover means, each hatch cover means including an inner part and an outer part, and a second pivot means pivotally connecting said inner and outer parts for movement between a substantially aligned position and a plurality of folded positions, each outer part being supported on one of said first pivot means for turning movement about said first pivot means in said first position from said aligned position to a partly folded position in which the respective outer part thereof engages the respective stop means on the associated pivot support whereby further turning of said hatch cover means about said first pivot axis is terminated; a pair of track means located on both sides of said hatch coaming; two pairs of trolley means, the trolley means of each pair being in rolling engagement with said pair of track means, respectively, each pair of trolley means including a pair of third pivot means pivotally connected to one of said inner parts, the axes of said first pivot means in said first position, and of said second and third pivot means being aligned in said aligned position of said hatch cover means; an operating means connected to said hatch cover means, respectively, for moving said inner and outer parts of each of said hatch cover means from said aligned position to said partly folded positions with said trolley means rolling on said track means, and said second pivot means moving along a circle about said first pivot means in said first position whereby said inner edges of said inner parts move apart, said operating means moving said hatch cover means from said partly folded position to a completely folded position with said outer parts and said link means turning together about said second pivot axis of the respective pivot support.

2. A hatch cover arrangement as set forth in claim 1 wherein each of said hatch cover means has at the outer end thereof at least one hinge member downwardly projecting from said sealing edge of said hatch coaming; and wherein each pivot support includes at least one fixed bracket, wherein said link means include a pair of links, a pivot connecting said pair of links with said fixed bracket for turning movement about said second pivot axis, and wherein said first pivot means connects said pair of links with said hinge member, the hinge member being located between said links of said pair of links; and wherein said stop means is a bar extending across and being fixedly secured to each pair of links and being located in the path of turning movement of the respective hinge member.

3. A hatch cover arrangement as set forth in claim 1 wherein each of said sealing edges of said hatch cover means includes a strip of sealing material forming the outer surface of each inner sealing edge and being in sealing engagement with the seal strip of the other inner sealed edge.

4. A hatch cover arrangement as set forth in claim 1 wherein the center of gravity of each of said hatch cover means in said completely folded position is located inwardly of a vertical plane passing through said second pivot axis so that each of said hatch cover means tends to move from said completely folded position to said aligned position for closing the hatch.

5. A hatch cover arrangement comprising, in combination, a hatch coaming having a sealing edge; two pivot supports respectively located on opposite ends of said hatch coaming, each pivot support including link means having a first pivot means with a first pivot axis, said link means being turnable about a second pivot axis with said first pivot means turning about said second pivot axis to and from a first position, each of said pivot supports further including stop means on said link means; a hatch cover including two hatch cover means, each hatch cover means including an inner part and an outer part, and a second pivot means pivotally connecting said inner and outer parts for movement between a substantially aligned position and a plurality of folded positions, each other part being supported on one of said first pivot means for turning movement about said first pivot means in said first position from said aligned position to a partly folded position in which the respective outer part thereof engages the respective stop means on the associated pivot support whereby further turning of said hatch cover means about said first pivot axis is terminated; a pair of track means located on both sides of said hatch coaming; two pairs of trolley means, the trolley means of each pair being in the rolling engagement with said pair of track means respectively, each pair of trolley means including a pair of third pivot means; first operating means associated with each of said hatch cover means, each first operating means including lever means pivotally mounted on the inner part of the respective hatch cover means and having free ends connected to the respective pair of third pivot means for raising said hatch cover means in aligned position from hatch closing position to a slightly raised position, the axes of said first pivot means in said first position, and of said second and third pivot means being aligned in said slightly raised position of said hatch cover means; and second operating means connected to said hatch cover means, respectively, for moving said inner and outer parts of said hatch cover means from said slightly raised aligned position to said partly folded position with said trolley means rolling on said track means, and said second pivot means moving along a circle about said first pivot means in said first position whereby said inner edges of said inner parts move apart, said second operating means further moving said hatch cover means from said partly folded position to a completely folded position with said outer parts and said link means turning together about said second pivot axis of the respective pivot support.

6. A hatch cover arrangement as set forth in claim 5 wherein the center of gravity of said outer part of each of said hatch cover means is located outwardly of a vertical plane passing through said second pivot axis in said completely folded position of said hatch cover means, and wherein in said completely folded position the center of gravity of said inner part of each of said hatch cover means is located inwardly of said vertical plane passing through said second pivot axis, and spaced a greater distance from the same than the center of gravity of said outer part is spaced from the same so that the center of gravity of the entire hatch cover means is located inwardly of said vertical plane passing through said second axis so that each of said hatch cover means tends to move from said completely folded position to said hatch closing position with said trolley means rolling on said track means.

7. A hatch cover arrangement comprising, in combination, a hatch coaming having a sealing edge; two pivot supports respectively located on opposite ends of said hatch coaming, each pivot support including link means having a first pivot means with a first pivot axis, said link means being turnable about a second pivot axis with said first pivot means turning about said second pivot axis to and from a first position, each of said pivot supports further including stop means on said link means; a hatch cover including two hatch cover means, each hatch cover means including an inner part and an outer part, and a second pivot means pivotally connecting said inner and outer parts for movement between a substantially aligned position and a plurality of folded positions, each outer part being supported on one of said first pivot means for turning movement about said first pivot means in said first position from said aligned position to a partly folded position in which the respective outer part thereof engages the respective stop means on the associated pivot support whereby further turning of said hatch cover means about said first pivot axis is terminated; a pair of track means located on both sides of said hatch coaming; two pairs of trolley means, each of said trolley means including a frame member and a third pivot means on said frame member pivotally connected to one of said inner parts, and a pair of wheels terminably mounted on said frame member underneath said third pivot means and engaging said track means, the axes of said first pivot means in said first position and of said second and third pivot means being aligned in said aligned position of said hatch cover means, the distance between the inner edge of the respective inner part and said third pivot means being smaller than the distance between the axis of said third pivot means and said sealing edge of said hatch coaming; an operating means connected to said hatch cover means, respectively, for moving said inner and outer parts of each of said hatch cover means from said aligned position to said partly folded positions with said trolley means rolling on said track means, and said second pivot means moving along a circle about said first pivot means in said first position whereby said inner edges of said inner parts move apart, said operating means moving said hatch cover means from said partly folded position to a completely folded position with said outer parts and said link means turning together, about said second pivot axis of the respective pivot support.

8. A hatch cover arrangement comprising, in combination, a hatch coaming having a sealing edge; two pivot supports respectively located on opposite ends of said hatch coaming, each pivot support including link means having a first pivot means with a first pivot axis, said link means being turnable about a second pivot axis with said first pivot means turning about said second pivot axis to and from a first position, each of said pivot supports further including stop means on said link means; a hatch cover including two hatch cover means, each hatch cover means including an inner part and an outer part, and a second pivot means pivotally connecting said inner and outer parts for movement between a substantially aligned position and a plurality of folded positions, each outer part being supported on one of said first pivot means for turning movement about said first pivot means in said first position from said aligned position to a partly folded position in which the respective outer part thereof engages the respective stop means on the associated pivot support whereby further turning of said hatch cover means about said first pivot axis is terminated; a pair of track means located on both sides of said hatch coaming; two pairs of trolley means, each of said trolley means including a frame member and a third pivot means on said frame member pivotally connected to one of said inner parts, and a pair of wheels terminably mounted on said frame member underneath said third pivot means and engaging said track means, the axes of said first pivot means in said first position and of said second and third pivot means being aligned in said aligned position of said hatch cover means, the distance between the inner edge of the respective inner part and said third pivot means being smaller than the distance between the axis of said third pivot means and said sealing edge of said hatch coaming; first operating means associated with each of said hatch cover means, each first operating means including lever means pivotally mounted on the inner part of the respective hatch cover means and having free ends connected to the respective pair of third pivot means for raising said hatch cover means in aligned position from hatch closing position to a slightly raised position, the axes of said first pivot means in said first position, and of said second and third pivot means being aligned in said slightly raised position of said hatch cover means; and second operating means connected to said hatch cover means, respectively, for moving said inner and outer parts of said hatch cover means from said slightly raised aligned position to said partly folded position with said trolley means rolling on said track means, and said second pivot means moving along a circle about said first pivot means in said first position whereby said inner edges of said inner parts move apart, said second operating means further moving said hatch cover means from said partly folded position to a completely folded position with said outer parts and said link means turning together about said second pivot axis of the respective pivot support.

9. A hatch cover arrangement comprising, in combination, a hatch coaming having a sealing edge; at least one pivot means located at one end of said hatch coaming; a hatch cover means including an inner part and an outer part, said inner and outer parts being pivotally connected to each other for movement between a substantially aligned position and a plurality of folded positions, said hatch cover means being supported at the outer end of said outer part thereof on said pivot means for turning movement about said pivot means to and from a hatch closing position in which said two parts engage said sealing edge of said hatch coaming, the inner part of said hatch cover means having an inner sealing edge including portions in sealing engagement with said sealing edge of said hatch coaming in said hatch closing position of said hatch cover means; a pair of track means respectively extending on both sides of the hatch coaming; a pair of trolley means, each trolley means including a frame member, a pivot member pivotally connected to said frame member, and wheel means turnably mounted on said frame member underneath said pivot member and engaging said track means; lever means including bell crank levers supporting said pivot members and being turnably supported on said inner parts; hydraulic servo-motor means fixedly secured to the inner part of said hatch cover means and including a reciprocable member pivotally connected to said lever means; and operating means connected to said hatch cover means for turning the same to said folded positions with said inner sealing edge of said hatch cover means moving on a circular path having its center in the axis of said pivot members, the distance between said axis of said pivot members and said inner sealing edge being smaller than the distance between said axis of said pivot members and said sealing edge of said hatch coaming so that said circular path is spaced from said sealing edge.

10. A hatch cover arrangement comprising, in combination, a hatch coaming having a sealing edge; two pivot supports respectively located on opposite ends of said hatch coaming, each pivot support including link means having a first pivot means with a first pivot axis, said link means being turnable about a second pivot axis with said first pivot means turning about said second pivot axis to and from a first position, each of said pivot supports further including stop means on said link means; a hatch cover including two hatch cover means, each hatch cover means including an inner part and an outer part, and a second pivot means pivotally connecting said inner and outer parts for movement between a substantially aligned position and a plurality of folded positions, each outer part being supported on one of said first pivot means for turning movement about said first pivot means in said first position from said aligned position to a partly folded position in which the respective outer part thereof engages the respective stop means on the associated pivot support whereby further turning of said hatch cover means about said first pivot axis is terminated; and an operating means connected to said hatch cover means, respectively, for moving said inner and outer parts of each of said hatch cover means from said aligned position to said partly folded positions, and from said partly folded position to a completely folded position with said outer parts and said link means turning together about said second pivot axis of the respective pivot support.

11. A hatch cover arrangement comprising, in combination, a hatch coaming having a sealing edge; two pivot supports respectively located on opposite ends of said hatch coaming, each pivot support including link means having a first pivot means with a first pivot axis, said first pivot means in said first position being located below said sealing edge of said hatch coaming, said link means being turnable about a second pivot axis with said first pivot means turning about said second pivot axis to and from a first position, each of said pivot supports further including stop means on said link means; a hatch cover including two hatch cover means, each hatch cover means including an inner part and an outer part, and a second pivot means pivotally connecting said inner and outer parts for movement between a substantially aligned position and a plurality of folded positions, each outer part being supported on one of said first pivot means for turning movement about said first pivot means in said first position from said aligned position to a partly folded position in which the respective outer part thereof engages the respective stop means on the associated pivot support whereby further turning of said hatch cover means about said first pivot axis is terminated; a pair of track means located on both sides of said hatch coaming; two pairs of trolley means, each of said trolley means including a frame member and a third pivot means on said frame member pivotally connected to one of said inner parts, and a pair of wheels terminably mounted on said frame member underneath said third pivot means and engaging said track means, the axes of said first pivot means in said first position and of said second and third pivot means being aligned in said aligned position of said hatch cover means, the distance between the inner edge of the respective inner part and said third pivot means being smaller than the distance between the axis of said third pivot means and said sealing edge of said hatch coaming; first operating means associated with each of said hatch cover means, each first operating means including lever means pivotally mounted on the inner part of the respective hatch cover means and having free ends connected to the respective pair of third pivot means for raising said hatch cover means in aligned position from hatch closing position to a slightly raised position, the axes of said first pivot means in said first position, and of said second and third pivot means being aligned in said slightly raised position of said hatch cover means; and second operating means connected to said hatch cover means, respectively, for moving said inner and outer parts of said hatch cover means from said slightly raised aligned position to said partly folded position with said trolley means rolling on said track means, and said second pivot means moving along a circle about said first pivot means in said first position whereby said inner edges of said inner parts move apart, said second operating means further moving said hatch cover means from said partly folded position to a completely folded position with said outer parts and said link means turning together about said second pivot axis of the respective pivot support.

12. A hatch cover arrangement comprising, in combination, a hatch coaming; first pivot means located at one end of said hatch coaming; a hatch cover means including a first part and a second part, and second pivot means having an axis parallel to the axis of said first pivot means and connecting said first and second parts for movement between a substantially aligned position and a plurality of folded positions, said second part being supported at the free end thereof on said first pivot means for turning movement; a member having a sealing edge extending parallel to said axes, said sealing edge being engaged by the free edge of said first part in hatch closing position of said hatch cover means; track means located adjacent said hatch coaming; trolley means adapted to roll on said track means and including frame means and third pivot means having an axis parallel to said axes; first operating means including a member supporting said third pivot means and movably mounted on said first part in the region of said free end thereof, said member moving, when actuated, said third pivot means to a position in which said first and second parts are turned about the axis of said first pivot means in aligned position from a hatch closing position to a raised position, the axis of said second pivot means being spaced from said hatch coaming at least the distance between said hatch coaming and a plane passing through said first and third pivot means in said aligned raised position of said parts; and second operating means connected to said hatch cover means for moving said first and second parts from said aligned raised position to said folded position, with said trolley means rolling on said track means while second pivot means move along a circular path about the axis of said first pivot means whereby said free edge of said first part moves away from said sealing edge during the first part of the folding movement.

13. A hatch cover arrangement comprising, in combination, a hatch coaming; first pivot means located at one end of said hatch coaming; a hatch cover means including a first part and a second part, and second pivot means having an axis parallel to the axis of said first pivot means and connecting said first and second parts for movement between a substantially aligned position and a plurality of folded positions, said second part being supported at the free end thereof on said first pivot means for turning movement; a member having a sealing edge extending parallel to said axes, said sealing edge being engaged by the free edge of said first part in hatch closing position of said hatch cover means; track means located adjacent said hatch coaming; trolley means adapted to roll on said track means and including frame means and third pivot means having an axis parallel to said axes, the distance between said free edge of said first part and said third pivot means being smaller than the distance between said third pivot means and said hatch coaming; first operating means including a member supporting said third pivot means and movably mounted on said first part in the region of said free end thereof, said member moving, when actuated, said third pivot means to a position in which said first and second parts are turned about the axis of said first pivot means in aligned position from a hatch closing position to a raised position, the axis of said second pivot means being spaced from said hatch coaming at least the distance between said hatch coaming and a plane passing through said first and third pivot means in said aligned raised position of said parts; and second operating means connected to said hatch cover means for moving said first and second parts from said aligned raised position to said folded position, with said trolley means rolling on said track means while second pivot means move along a circular path about the axis of said first pivot means whereby said free edge of said part moves away from said sealing edge during the first part of the folding movement and along a circular path having its center in the axis of said third pivot means and being spaced from said hatch coaming.

14. A hatch cover arrangement comprising, in combination, a hatch coaming having a sealing edge; two first pivot means respectively located on opposite ends of said hatch coaming; a hatch cover including two hatch cover means, each hatch cover means including a first part and a second part, and a second pivot means pivotally connecting said first and second parts for movement between a substantially aligned position and a plurality of folded positions, said second part being supported at the free end thereof on one of said first pivot means for turning movement, each of said first parts having an inner edge located opposite and in sealing engagement with the inner edge of the other first part in hatch closing position of said hatch cover; a pair of track means respectively located on both sides of said hatch coaming; two pairs of trolley means, the trolley means of each pair being in rolling engagement with said pair of track means, each pair of trolley means including a pair of third pivot means; first operating means associated with each of said hatch cover means, each first operating means including lever means pivotally mounted on said first part of the respective hatch cover means and having free ends connected to the respective pair of third pivot means for raising said hatch cover means in aligned position from hatch closing position to a slightly raised position, the axes of first, second and third pivot means being aligned in said slightly raised position; and second operating means connected to said hatch cover means, respectively, for moving said first and second parts of each of said hatch cover means from said slightly raised aligned position to said folded positions with said trolley means rolling on said track means, and said second pivot means moving along a circle about said first pivot means whereby said inner edges of said first parts move apart, each of said trolley means including a frame member supporting said third pivot means and a pair of wheel means turnably mounted on said frame member underneath said third pivot means and engaging said track means, wherein during movement of each hatch cover means from said slightly raised position to said folded positions, the respective inner edge of said first part moves on a circular path having its center in the axes of said third pivot means, the distance between said inner edge and said third pivot means being smaller than the distance between said third pivot means and said sealing edge of said hatch coaming.

References Cited in the file of this patent
UNITED STATES PATENTS

| | | |
|---|---|---|
| 2,627,835 | Mege | Feb. 10, 1953 |
| 2,697,998 | Jernstrom | Dec. 28, 1954 |
| 2,799,238 | Suderow | July 16, 1957 |